(12) United States Patent
Vergyri et al.

(10) Patent No.: US 12,499,887 B2
(45) Date of Patent: Dec. 16, 2025

(54) HYBRID HUMAN-ASSISTED DIALOGUE SYSTEM

(71) Applicant: SRI International, Menlo Park, CA (US)

(72) Inventors: Dimitra Vergyri, Sunnyvale, CA (US); Harry Bratt, Mountain View, CA (US)

(73) Assignee: SRI International, Menlo Park, CA (US)

( * ) Notice: Subject to any disclaimer, the term of this patent is extended or adjusted under 35 U.S.C. 154(b) by 342 days.

(21) Appl. No.: 18/068,713

(22) Filed: Dec. 20, 2022

(65) Prior Publication Data

US 2023/0260510 A1    Aug. 17, 2023

Related U.S. Application Data

(60) Provisional application No. 63/268,353, filed on Feb. 22, 2022.

(30) Foreign Application Priority Data

Feb. 16, 2022    (GR) ............... 20220100141

(51) Int. Cl.
*G10L 15/22* (2006.01)
*G10L 13/04* (2013.01)
(Continued)

(52) U.S. Cl.
CPC .............. *G10L 15/22* (2013.01); *G10L 13/04* (2013.01); *G10L 15/01* (2013.01); *G10L 15/063* (2013.01); *G10L 15/14* (2013.01); *H04M 3/5166* (2013.01)

(58) Field of Classification Search
CPC ..................................................... G10L 15/22
(Continued)

(56) References Cited

U.S. PATENT DOCUMENTS 5,802,361 A    9/1998   Wang et al.
6,119,147 A    9/2000   Toomey et al.
(Continued)

FOREIGN PATENT DOCUMENTS

AU    2015355337 B2 * 10/2018   ........... A61B 5/4839
DK    201670368 A1 *  1/2017   ............ H04M 1/247
(Continued)

OTHER PUBLICATIONS

"Accelerated Pictures—Filmmaker Live—VR Storyboarding," Retrieved from Photos—filmmaker live vr storyboarding.png, Nov. 2018, 1 pp.
(Continued)

*Primary Examiner* — Bharatkumar S Shah
(74) *Attorney, Agent, or Firm* — Shumaker & Sieffert, P.A.

(57) ABSTRACT

An automated interactive voice dialogue system using a human-in-the-loop design may enable human-supported interventions, where the automated system still conducts most of the interaction but enables a human agent to assume control of the dialogue and assist, if deemed necessary, so that the user may continue the interaction with little interruption or frustration. In some examples, the user of the dialogue system of this disclosure may not realize that there was a problem, and that the interaction is being or has switched from an automated dialogue system to a human. In some examples, the automated dialogue system of this disclosure may also automatically switch back to machine interaction when the human agent has resolved the situation.

20 Claims, 4 Drawing Sheets

(51) Int. Cl.
*G10L 15/01* (2013.01)
*G10L 15/06* (2013.01)
*G10L 15/14* (2006.01)
*H04M 3/51* (2006.01)

(58) Field of Classification Search
USPC .......................................................... 704/243
See application file for complete search history.

(56) References Cited

U.S. PATENT DOCUMENTS

| | | |
|---|---|---|
| 6,593,936 B1 | 7/2003 | Huang et al. |
| 6,741,655 B1 | 5/2004 | Chang et al. |
| 7,266,771 B1 | 9/2007 | Tow et al. |
| 9,129,158 B1 | 9/2015 | Medasani et al. |
| 9,473,742 B2 | 10/2016 | Griffin et al. |
| 9,786,084 B1 | 10/2017 | Bhat et al. |
| 9,858,340 B1 | 1/2018 | Frey et al. |
| 9,875,445 B2 | 1/2018 | Amer et al. |
| 10,334,384 B2 | 6/2019 | Sun et al. |
| 10,567,185 B2 | 2/2020 | Cartwright et al. |
| 10,645,035 B2 | 5/2020 | Nowak-Przygodzki et al. |
| 10,789,755 B2 | 9/2020 | Amer et al. |
| 10,915,570 B2 | 2/2021 | Ramamurthy et al. |
| 11,018,885 B2 | 5/2021 | Niekrasz |
| 12,026,638 B2 * | 7/2024 | Caligor .................. G06Q 10/00 |
| 2004/0114541 A1 | 6/2004 | Caspi et al. |
| 2004/0230655 A1 | 11/2004 | Li et al. |
| 2004/0246331 A1 | 12/2004 | Caspi et al. |
| 2005/0021334 A1 | 1/2005 | Iwahashi |
| 2005/0080782 A1 | 4/2005 | Ratnaparkhi et al. |
| 2007/0087756 A1 * | 4/2007 | Hoffberg .......... G06Q 10/06375 |
| | | 455/450 |
| 2007/0192305 A1 | 8/2007 | Finley et al. |
| 2008/0071771 A1 | 3/2008 | Venkataraman et al. |
| 2008/0071831 A1 | 3/2008 | Reddy |
| 2008/0126303 A1 | 5/2008 | Park et al. |
| 2008/0140644 A1 | 6/2008 | Franks et al. |
| 2010/0070523 A1 | 3/2010 | Delgo et al. |
| 2012/0166921 A1 | 6/2012 | Alexandrov et al. |
| 2012/0290289 A1 | 11/2012 | Manera et al. |
| 2013/0191452 A1 | 7/2013 | Beerse et al. |
| 2013/0325972 A1 | 12/2013 | Boston et al. |
| 2015/0019537 A1 | 1/2015 | Neels et al. |
| 2015/0348538 A1 | 12/2015 | Donaldson |
| 2016/0027442 A1 | 1/2016 | Burton et al. |
| 2016/0110453 A1 | 4/2016 | Kim et al. |
| 2016/0253415 A1 | 9/2016 | Zhong et al. |
| 2017/0127016 A1 | 5/2017 | Yu et al. |
| 2017/0235848 A1 * | 8/2017 | Van Dusen ........ G06Q 30/0201 |
| | | 705/12 |
| 2017/0364792 A1 | 12/2017 | Chai et al. |
| 2018/0068019 A1 | 3/2018 | Novikoff et al. |
| 2018/0077099 A1 | 3/2018 | Silva et al. |
| 2018/0122383 A1 | 5/2018 | Raanani et al. |
| 2018/0137402 A1 | 5/2018 | Bar et al. |
| 2018/0144059 A1 | 5/2018 | Saikia et al. |
| 2018/0213013 A1 | 7/2018 | Adams et al. |
| 2018/0227339 A1 | 8/2018 | Rodriguez et al. |
| 2018/0288431 A1 | 10/2018 | Liu et al. |
| 2018/0293304 A1 | 10/2018 | Miller et al. |
| 2018/0293308 A1 | 10/2018 | Miller et al. |
| 2018/0331842 A1 | 11/2018 | Faulkner et al. |
| 2018/0336902 A1 | 11/2018 | Cartwright et al. |
| 2019/0028520 A1 | 1/2019 | Nawrocki |
| 2019/0034767 A1 | 1/2019 | Sainani et al. |
| 2019/0108834 A1 | 4/2019 | Nelson et al. |
| 2019/0130917 A1 | 5/2019 | Pogorelik et al. |
| 2019/0132265 A1 | 5/2019 | Nowak-Przygodzki et al. |
| 2019/0147367 A1 | 5/2019 | Bellamy et al. |
| 2019/0171760 A1 | 6/2019 | Ikeda |
| 2019/0213254 A1 | 7/2019 | Ray et al. |
| 2019/0224853 A1 | 7/2019 | Gewecke et al. |
| 2019/0251952 A1 | 8/2019 | Arik et al. |
| 2019/0294999 A1 | 9/2019 | Guttmann |
| 2019/0295041 A1 | 9/2019 | Sim et al. |
| 2019/0297126 A1 | 9/2019 | Graziano et al. |
| 2019/0303404 A1 | 10/2019 | Amer et al. |
| 2019/0304104 A1 | 10/2019 | Amer et al. |
| 2019/0304157 A1 | 10/2019 | Amer et al. |
| 2019/0379742 A1 | 12/2019 | Simpkinson et al. |
| 2019/0384813 A1 | 12/2019 | Mahmoud |
| 2019/0384854 A1 | 12/2019 | Mahmoud |
| 2020/0097766 A1 | 3/2020 | Min et al. |
| 2020/0380952 A1 | 12/2020 | Zhang et al. |
| 2024/0381317 A1 * | 11/2024 | Hwang ............ H04W 52/0216 |

FOREIGN PATENT DOCUMENTS

| | | |
|---|---|---|
| EP | 2665023 A1 | 11/2013 |
| WO | 2017161233 | 9/2017 |
| WO | 2017184204 A1 | 10/2017 |
| WO | 2020227557 A1 | 11/2020 |
| WO | 2021262238 A1 | 12/2021 |
| WO | WO-2024025863 A1 * | 2/2024 ............ G06Q 10/04 |

OTHER PUBLICATIONS

"MUVIZU animation software," retrieved from http://www.muvizu.com/, May 28, 2019, 4 pp.
"CMU Graphics Lab Motion Capture Database," retrieved from http://mocap.cs.cmu.edu, Jun. 12, 2019, 84 pp.
"Hollywood Camera Work—Shot Designer—Can you block a scene in 30 seconds?" retrieved from https://www.hollywoodcamerawork.com/shot-designer.html , Aug. 27, 2019, 6 pp.
"Hollywood Camera Work—Causality Groundbreaking story development and writing app," retrieved from https://www.hollywoodcamerawork.com/causality.html , Aug. 27, 2019, 12 pp.
"MovieGraphs.png", retrieved from http://moviegraphs.cs.toronto.edu/, Nov. 2018, 1 pp.
"SLING: A Natural Language Frame Semantics Parser," retrieved from https://github.com/google/sling, May 28, 2019, 3 pp.
"Syntactic Structures" Wikipedia, retrieved from https://en.wikipedia.org/wiki/Syntactic Structures , May 29, 2019, 21 pp.
"The Stanford Parser: A Statistical Parser," retrieved from https://nlp.stanford.edu/software/lex-parser, Apr. 10, 2019, 15 pp.
Abadi et al., "Tensor-Flow: Large-Scale Machine Learning on Heterogeneous Distributed Systems," arXiv, Mar. 16, 2016, 19 pp.
Ahn et al., "Text2Action: Generative Adversarial Synthesis from Language to Action," CoRR, ArXiv, Oct. 24, 2017, 8 pp.
Allen et al., "Deep Semantic Analysis of Text," Proceedings of the 2008 Conference on Semantics in Text Processing, STPE 08. Association for Computational Linguistics, Sep. 2018, 12 pp.
Amer et al., "1st Workshop on Computational Models of Social Interactions and Behavior: Scientific Grounding, Sensing, and Applications," Proceedings of the Computer Vision and Pattern Recognition, Jun. 2014, 7 pp.
Amer et al., "2nd Workshop on Computational Models of Social Interactions: Human-Computer-Media Communication (HCMC2015)," Proceedings of the 23rd ACM International Conference on Multimedia, Oct. 2015, 2 pp.
Amer et al., "Deep Multimodal Fusion: A Hybrid Approach," International Journal of Computer Vision, vol. 126, Feb. 20, 2017, 17 pp.
Amer et al., "Emotion Detection in Speech Using Deep Networks," 2014 IEEE International Conference on Acoustics, Speech and Signal Processing (ICASSP), May 2014, 5 pp.
Anonymous, "A Modular Interface for Multimodal Data Annotation and Visualization with Applications to Conversational AI and Commonsense Grounding," submission to Graphics Interface 2020 Conference, May 2020, 10 pp.
Anonymous, "Auto-Conditioned LSTM Network for Extended Complex Human Motion Synthesis," (ICLR), Jul. 2018, 13 pp.
Arjovsky et al., "Wasserstein GAN," ArXiv, Dec. 6, 2017, 32 pp.
Awad et al., "TRECVID 2017: Evaluating Ad-Hoc and Instance Video Search, Events Detection, Video Captioning and Hyperlinking," Proceedings of TRECVID 2017, Nov. 2017, 20 pp.

(56) References Cited

OTHER PUBLICATIONS

Barratt et al., "A Note on the Inception Score," ArXiv, Jun. 2018, 9 pp.
Barsoum et al., "HP-GAN: Probabilistic 3D Human Motion Prediction Via GAN," IEEE/CVF Conference on Computer Vision and Pattern Recognition Workshops, ArXiv, Nov. 2017, 10 pp.
Beattie et al., "DeepMind Lab," CoRR, Dec. 2016, 11 pp.
Belghazi et al., "MINE: Mutual Information Neural Estimation," ArXiv, Jun. 2018, 18 pp.
Bengio et al., "Curriculum Learning," Proceedings of the 26 th International Conference on machine Learning, Jun. 2009, 8 pp.
Bird et al., "Natural Language Processing with Python," O'Reilly Media, Inc., 2009, 504 pp. Applicant points out, in accordance with MPEP 609.04(a), that the year of publication, 2009, is sufficiently earlier than the effective U.S. filing date, so that the particular month of publication is not an issue.).
Bojanowski, P., "Learning to annotate dynamic video scenes," Computer Vision and pattern Recognition [cs.CV]. ecole normale supérieure, Sep. 2016, 143 pp.
Burger et al., "The ISL Meeting Corpus: The impact of meeting type on speech style." In proceedings of the 7th International Conference on Spoken Language Processing, ICSLP2002, Sep. 2002, 4 pp.
Butepage et al., "Deep Representation Learning for Human Motion Prediction and Classification," IEEE Conference on Computer Vision and Pattern Recognition (CVPR), Apr. 2017, 9 pp.
Cao et al., "Realtime Multi-Person 2D Pose Estimation using part Affinity Fields," ArXiv, Apr. 2017, 9 pp.
Chai et al., "Low Precision Neural Networks Using Subband Decomposition," CogArch Workshop, Apr. 2016, 5 pp.
Chambers et al., "Unsupervised Learning of Narrative Event Chains," Proceedings of Association for Computational Linguistics (ACL-08); Jun. 2008, 9 pp.
Chambers et al., "Unsupervised Learning of Narrative Schemas and Their Participants," Proceedings of the Joint Conference of the 47 th Annual Meeting of the ACL and the 4 th International Joint Conference on National Language Processing of the AFNLP, Aug. 2009, 9 pp.
Chen et al., "Sequence Synopsis: Optimize Visual Summary of Temporal Event Data," IEEE Transactions on Visualization and Computer Graphics: vol. 24, Issue 1, Jan. 2018, 11 pp.
Chen et al., "MXNet: A Flexible and Efficient Machine Learning Library for Heterogeneous Distributed Systems," ArXiv, Dec. 2015, 6 pp.
Chen et al., "Show, Observe and Tell: Attribute-Driven Attention Model for Image Captioning," Proceedings of the 27 th International Joint Conference on Artificial Intelligence, Jul. 2018, 7 pp.
Chuang et al., "Interpretation and Trust: Designing Model-Driven Visualizations for Text Analysis," Proceedings of the SIGCHI Conference on Human Factors in Computing Systems, May 2012, 10 pp.
Church et al., "Coping with Syntactic Ambiguity or How to put the Block in the Box on the Table," American Journal of Computational Linguistics, vol. 8 No. 3-4, Jul.-Dec. 1982, 11 pp.
Dork et al., "Critical InfoVis: Exploring the Politics of Visualization," CHI '13 Extended Abstracts on Human Factors in Computing Systems, May 2013, 10 pp.
Ehrlich et al., "Facial Attributes Classification Using Multi-Task Representation Learning," Proceedings of the IEEE Conference on Computer Vision and Pattern Recognition Workshops, Jun. 2016, 9 pp.
El-Assady et al., "ConToVi: Multi-Party Conversation Exploration Using Topic-Space Views," Computer Graphics Forum, vol. 35, No. 3, Jul. 2016, 10 pp.
Elliott et al., "Image description using visual dependency representations." Proceedings of the 2013 Conference on Empirical Methods in Natural Language Processing, Association for Computer Linguistics, Oct. 2013, pp. 1-11.
Faghri et al., "VSE++: Improved Visual-Semantic Embeddings," ArXiv, Jul. 2017, 9 pp.

Ferguson et al., "Mixed-Initiative Systems for Collaborative Problem Solving," AI Magazine, vol. 28, No. 2, Jun. 2007, 10 pp.
Fragkiadaki et al., "Recurrent Network Models for Kinematic Tracking," IEEE Conference on Computer Vision and Pattern Recognition (CVPR), Aug. 2015, 9 pp.
Freitag, "Trained Named Entity Recognition Using Distributional Clusters," Proceedings of the 2004 Conference on Empirical Methods in natural language Processing, (EMNLP), Jul. 2004, 8 pp.
Gauthier, "Conditional Generative Adversarial Nets for Face Generation," Technical Report, 2015, 9 pp. (Applicant points out, in accordance with MPEP 609.04(a), that the year of publication, 2015, is sufficiently earlier than the effective U.S. filing date, so that the particular month of publication is not in issue.).
Ghosh et al., "Learning Human Motion Models for Long-Term Predictions," IEEE Conference on Computer Vision and Pattern Recognition (CVPR), Dec. 3, 2017, 12 pp.
Godard et al., "Unsupervised Monocular Depth Estimation with Left-Right Consistency," ArXiv, Apr. 2017, 14 pp.
Goodfellow et al., "Generative Adversarial Networks," Proceedings of the International Conference on Neural Information Processing Systems (NIPS), Dec. 2014, 9 pp.
Gotz et al., "HARVEST: An Intelligent Visual Analytic Tool for the Masses," Proceedings of the 1st International Workshop on Intelligent Visual Interfaces for Text Analysis, Feb. 2010, 4 pp.
Graves et al., "Automated Curriculum Learning for Neural Networks," Proceedings of the 34 th International Conference on Machine Learning (ICML), Apr. 2017, 10 pp.
Gulrajani et al., "Improved Training of Wasserstein GANs," NIPS'17 Proceedings of the 31 st International Conference on Neural Information Processing Systems (NIPS 2017), arXiv:1704.00028v3, Dec. 25, 2017, 20 pp.
Habibie et al., "A Recurrent Variational Autoencoder for Human Motion Synthesis," The 28 th British Machine Vision Conference (BMVC), Apr. 2017, 12 pp.
Hahne, "CMU Graphics Lab Motion Capture Database Motionbuilder-Friendly BVH Conversion," retrieved from https:/sites.google.com/a/cgspeed.com/cgspeed/motion-capture/cmu-bvh-conversion, May 29, 2019, 4 pp.
Hanser, E. et al., "Text-to-Animation: Affective Intelligent and Multimodal Visualisation of Natural Language Scripts," School of Computing and Intelligent Systems, University of Ulster, Jun. 2009, 34 pp.
Harrison et al., "Toward Automated Story Generation with Markov Chain Monte Carlo Methods and Deep Neural Networks," Association for the Advancement of Artificial Intelligence (AIIDE-17) Workshop on Intelligent Narrative Technologies, Sep. 2017, 7 pp.
Hendricks et al., "Generating Visual Explanations," ArXiv, Mar. 2016, 17 pp.
Hermann et al., "Grounded Language Learning in a Simulated 3d World," CoRR, Jun. 2017, 22 pp.
Hewlett et al., "Wubble World," Association for the Advancement of Artificial Intelligence (AIIDE), Mar. 2007, 5 pp.
Higgins et al., "Beta-VAE: Learning Basic Visual Concepts with a Constrained Variational Framework," International Conference on Learning Representations, Apr. 2017, 22 pp.
Hinton et al., "A Fast Learning Algorithm for Deep Belief Nets," Neural Computation, vol. 18, Jul. 2006, 28 pp.
Hinton et al., "Reducing the Dimensionality of Data with Neural Networks," Science, vol. 313, Jul. 2006, 4 pp.
Hjelm et al., "Boundary-Seeking Generative Adversarial Networks," ICLR, Feb. 2018, 17 pp.
Hochreiter et al., "Long Short-Term Memory," Neural Computation, vol. 9, No. 8, Nov. 1997, 32 pp.
Iizuka et al., "Globally and Locally Consistent Image Completion," ACM Transactions on Graphics, vol. 36, No. 4, Jul. 2017, 14 pp.
Ionescu et al., "Human3.6M: Large Scale Datasets and Predictive Methods for 3D Human Sensing in Natural Environments," IEEE Transactions on Pattern Analysis and Machine Intelligence, vol. 36, No. 7, Jul. 2014, 15 pp.
Jain et al., "Structural-RNN: Deep Learning on Spatio-Temporal Graphs," IEEE Conference on Computer Vision and Pattern Recognition (CVPR), Apr. 2016, 10 pp.

(56) References Cited

OTHER PUBLICATIONS

Jardonnet, "Leveraging plot summaries for video understanding," ENS Cachan, Sep. 22, 2010, 30 pp.
Johnson et al., "Image retrieval using scene graphs," Proceedings of the IEEE Conference on Computer Vision and Pattern Recognition (CVPR), Jun. 7-12, 2015, pp. 3668-3678.
Johnson et al., "The Malmo Platform for Artificial Intelligence Experimentation," Proceedings of the 25 th International Joint Conference on Artificial Intelligence (IJCAI-16), Jul. 2016, 2 pp.
Karpathy et al., "Deep Visual-Semantic Alignments for Generating Image Descriptions," IEEE Conference on Computer Vision and Pattern Recognition (CVPR), Apr. 2015, 17 pp.
Karpathy et al., "Visualizing and Understanding Recurrent Networks," ArXiv, Nov. 2015, 12 pp.
Kerr et al., "Learning in Wubble World," 2007 IEEE 6 th International Conference on Development and Learning, 2007 ICDL, Jul. 2007, 6 pp.
Khan, M., "Natural Language Descriptions for Video Streams," Dissertation for the University of Sheffield, Dec. 2012, 182 pp.
Kim et al., "29a3d53306ddfeefa47f7f088f4c2672", retrieved from http://xai-view.ckprototype.com/#29a3d53306ddfeefa47f7f088f4c2672/1 , Jun. 11, 2019, 6 pp.
Kim et al., "A Modular Interface for Multimodal Data Annotations and Visualization," Proceedings of the 24 th International Conference on Intelligent User Interfaces: Companion, Mar. 2019, 6 pp.
Kim et al., "Demo-Text Parse—TRIPS" retrieved from http://cwc-view.ckprototype.com/#18981621125165926 , May 30, 2019, 1 pp.
Kim et al., "Learn, Generate, Rank, Explain: A Case Study of Visual Explanation by Generative Machine Learning," Association for Computing Machinery, Apr. 2019, 29 pp.
Kim et al., "Learn, Generate, Rank: Generative Ranking of Motion Capture," blog post retrieved from http://genrank.ckprototype.com on May 30, 2019, 7 pp.
Kim et al., "Learn, Generate, Rank: Generative Ranking of Motion Capture," Demo Session at European Conference on Computer Vision, Sep. 2018, 2 pp.
Kim et al., "SMILEE: Symmetric Multi-modal Interactions with Language-gesture Enabled (AI) Embodiment," Proceedings of the 2018 Conference of the North American Chapter of the Association for Computational Linguistics, Jun. 2018, 5 pp.
Kingma et al., "Adam: A Method for Stochastic Optimization," CoRR, ArXiv, Jan. 2017, 15 pp.
Kingsbury et al., "From Treebank to PropBank," Proceedings of the 3 rd International Conference on Language Resources and Evaluation (LREC 2002), May 2002, 5 pp.
Kiros et al., "Skip-Thought Vectors," Advances in Neural Information Processing Systems, Jun. 2015, 11 pp.
Kiros et al., "Unifying Visual-Semantic Embeddings with Multimodal Neural Language Models," ArXiv, Nov. 2014, 13 pp.
Koh et al., "Understanding Black-Box Predictions via Influence Functions," Proceedings of the 34 th International Conference on Machine Learning, Jul. 2017, 11 pp.
Kulesza et al., "Principles of Explanatory Debugging to Personalize Interactive Machine Learning," Proceedings of the 20 th International Conference on Intelligent User Interfaces, Mar. 2015, 12 pp.
Ledig et al., "Photo-Realistic Single Image Super-Resolution Using a Generative Adversarial Network," IEEE Conference on Computer Vision and Pattern Recognition (CVPR), May 2017, 19 pp.
Li et al., "Video Generation from Text", The Thirty-Second AAAI Conference on Artificial Intelligence (AAAI-18), pp. 7065-7072, (Feb. 2018).
Li et al., "Tell Me Where to Look: Guided Attention Inference Network," Computer Vision and Pattern Recognition, Feb. 2018, 10 pp.
Lin et al., "Human Motion Modeling using DVGANs" ArXiv; May 2018, 23 pp.
Lin et al., "Leveraging Visual Question Answering for Image-Caption Ranking," Proceedings of the 14 th European Conference on Computer Vision (ECCV), Aug. 2016, 21 pp.
Liu et al., "Scrip Visualization (Scrip Vis): a smart system that makes writing fun," Proceeding of the Second International Conference on Machine Learning and Cybernetics, (IEEE Cat. No. 03EX693), vol. 5, IEEE, Nov. 2003, 6 pp.
Liu et al., "Towards Better Analysis of Deep Convolutional Neural Networks," IEEE Transactions on Visualization and Computer Graphics, vol. 23, No. 1, May 2016, 10 pp.
Liu et al., Unsupervised Image-to-Image Translation Networks, 31 st Conference on Neural Information Processing Systems (NIPS), Jul. 2018, 11 pp.
Maaten et al., "Visualizing Data using t-SNE," Journal on Machine Learning Research, vol. 9, Nov. 2008, 27 pp.
Manning et al., "Foundations of Statistical Natural Language Processing," 1999, 704 pp. (Applicant points out, in accordance with MPEP 609.04(a), that the year of publication, 1999, is sufficiently earlier than the effective U.S. filing date, so that the particular month of publication is not an issue.).
Manning et al., "The Stanford CoreNLP Natural Language Processing Toolkit," Proceedings of 52 nd Annual Meeting of the Association for Computational Linguistics: System Demonstrations, Association for Computational Linguistics, Jun. 2014, 6 pp.
Marti et al., "CARDINAL: Computer-Assisted Authoring of Movie Scripts," IUI '18 23 rd International Conference on Intelligent User Interfaces, Mar. 2018, 11 pp.
Martin et al., "Event Representations for Automated Story Generation with Deep Neural Nets," 32 nd AAAI Conference on Artificial Intelligence, Feb. 2018, 8 pp.
Martin et al., "Improvisational Storytelling Agents," 31 st Conference on Neural Information Processing Systems (NIPS-2017), Dec. 4, 2017, 4 pp.
Martinez et al., "On Human Motion Prediction using Recurrent Neural Networks," IEEE Conference on Computer Vision and Pattern Recognition (CVPR), May 2017, 10 pp.
McClosky et al., "Event Extraction as Dependency Parsing," Proceedings of 49 th Annual Meeting of the Association for Computational Linguistics, BioNLP Shared Task 2011 Workshop, Jun. 2011, 10 pp.
Meo et al., "Aesop: A Visual Storytelling Platform for Conversational AI," Proceedings of the 27 th International Joint Conference on Artificial Intelligence (IJCAI-18), Jul. 13-19, 2018, 3 pp.
Mihalcea et al., "TextRank: Bringing Order into Texts," retrieved from https://www.aclweb.org/anthology/W04-3252, 2004, 8 pp. (Applicant points out, in accordance with MPEP 609.04(a), that the year of publication, 2004, is sufficiently earlier than the effective U.S. filing date, so that the particular month of publication is not in issue.).
Mikolov et al., "Efficient Estimation of Word Representations in Vector Space," CoRR, ArXiv, Sep. 2013, 12 pp.
Mur-Artal et al., "ORB-SLAM: A Versatile and Accurate Monocular SLAM System," IEEE Transactions on Robotics, vol. 31, No. 5, Oct. 2015, 17 pp.
Nguyen et al., "Estimating Divergence Functionals and the Likelihood Ratio by Convex Risk Minimization," IEEE Transactions on Information Theory, vol. 56, No. 11, Nov. 2010, 15 pp.
Olah et al., "The Building Blocks of Interpretability," Distill Publication, Mar. 2018, 24 pp.
Perera et al., "Natural Language Dialogue for Building and Learning Models and Structures," Proceedings of the 31 st AAAI Conference on Artificial Intelligence (AAAI-17), Feb. 2017, 2 pp.
Press et al., "Language Generation with Recurrent Generative Adversarial Networks Without Pre-Training," ArXiv, Dec. 21, 2017, 5 pp.
Radford et al., "Unsupervised Representation Learning with Deep Convolutional Generative Adversarial Networks," ArXiv, Jan. 2016, 16 pp.
Raghavan et al., "BitNet: Bit-Regularized Deep Neural Networks," ICLR, 2018 Conference, Nov. 2018, 11 pp.
Raghavan et al., "GPU Activity Prediction Using Representation Learning," Proceedings of the 33 rd International Conference on Machine Learning, Mar. 2017, 5 pp.

(56) References Cited

OTHER PUBLICATIONS

Ramachandram et al., "Structure Optimization for Deep Multimodal Fusion Networks Using Graph-Induced Kernels," Proceedings of the 25 th European Symposium on Artificial Neural Networks, Jul. 2017, 6 pp.
Redmon et al., "YOLO9000: Better, Faster, Stronger," IEEE Conference on Computer Vision and Pattern Recognition, Dec. 2016, 9 pp.
Redmon et al., "You Only Look Once: Unified, Real-Tie Object Detection," 2016 IEEE Conference on Computer Vision and Pattern Recognition (CVPR), May 2016, 10 pp.
Ribeiro et al., "Why Should I Trust You?": Explaining the Predictions of Any Classifier,Proceedings of the 22 nd ACM SIGKDD International Conference on Knowledge Discovery and Data Mining, Aug. 2016, 10 pp.
Ringgaard et al., "SLING: A Framework for Frame Semantic Parsing," CoRR, Oct. 2017, 9 pp.
Salakhutdinov et al., "Deep Boltzmann Machines," Proceedings of the 12 th International conference on Artificial Intelligence and Statistics (AISTATS), Apr. 2009; 8 pp.
Salimans et al., "Improved Techniques for Training GANs," 30 th Conference on Neural Information Processing Systems (NIPS), Jun. 2016, 10 pp.
Schroff et al., "FaceNet: A Unified Embedding for Face Recognition and Clustering," 2015 IEEE Conference on Computer Vision and Pattern Recognition (CVPR), Jun. 2015, 10 pp.
Shields et al., "Action-Affect-Gender Classification Using Multi-Task Representation Learning," Proceedings of the IEEE Conference on Computer Vision and Pattern Recognition Workshops, Jul. 2017, 10 pp.
Siddiquie et al., "The Tower Game Dataset: A Multimodal Dataset for Analyzing Social Interaction Predicates," 2015 International Conference on Affective Computing and Intelligent Interaction (ACII), Sep. 2015, 8 pp.
Stites et al., "Who Did What to Whom? Children Track Story Referents First in Gesture," Journal of Psycholinguist Research, vol. 46, No. 4, Aug. 2017, 14 pp.
Sutskever et al., "Learning Multilevel Distributed Representations for High-Dimensional Sequences," Proceedings of the 11 th International Conference on Artificial Intelligence and Statistics (AISTATS), Jan. 2007, 8 pp.
Sutskever et al., "Sequence to Sequence Learning with Neural Networks," CoRR, ArXiv, Dec. 2014, 9 pp.
Sutskever et al., "The Recurrent Temporal Restricted Boltzmann Machine," NIPS'08 Proceedings of the 21 st International Conference on Neural Information Processing Systems (NIPS), Dec. 2008, 8 pp.
Taigman et al., "DeepFace: Closing the Gap to Human-Level Performance in Face Verification," 2014 IEEE Conference on Computer Vision and Pattern Recognition, Jun. 2014, 8 pp.
Tapaswi et al., "MovieQA: Understanding Stories in Movies Through Question—Answering," IEEE Conference on Computer Vision and Pattern Recognition (CVPR), Sep. 2016, 10 pp.
Taylor et al., "Two Distributed-State Models for Generating High-Dimensional Time Series," Journal of Machine Learning Research, vol. 12, Feb. 2011, 44 pp.
Tozzo etal "Neural Events Extraction from Movie Descriptions" Proceedings of the First Workshop on Storytelling, Jun. 2018, 7 pp.
Tran et al., "Edward: A Library for Probabilistic Modeling, Inference, and Criticism," arXiv, Feb. 2017, 33 pp.
U.S. Appl. No. 63/222,226, filed Jul. 15, 2021, naming inventors Lubin et al.
Vicol et al., "MovieGraphs: Towards Understanding Human-Centric Situations from Videos," CoRR, ArXiv, Apr. 2018, 23 pp.
Vinyals et al., "Show and Tell: A Neural Image Caption Generator," Computer Vision and Pattern Recognition, Apr. 2015, 9 pp.
Wang et al., "High-Resolution Image Synthesis and Semantic Manipulation with Conditional GANs," IEEE Conference on Computer Vision and Pattern Recognition (CVPR), Aug. 2018, 14 pp.
Werbos, "Backpropagation Through Tie: What it Does and How to Do It," Proceedings of the IEEE, vol. 78, No. 10, Oct. 1990, 11 pp.
Weston et al., "Towards AI-complete Question Answering: A Set of Prerequisite Toy Tasks," CORR, ArXiv, Dec. 2015, 14 pp.
Winograd, "Understanding Natural Language," Cognitive Psychology, vol. 3, No. 1, Jan. 1972, 1-191 pp.
Xu et al., "Scene graph generation by iterative message passing," Proceedings of the IEEE Conference on Computer Vision and Pattern Recognition (CVPR) Jul. 21-26, 2017, pp. 5410-5419.
Zahavy et al., "Graying the Black Box: Understanding DQNs," Proceedings of the 33rd International Conference on Machine Learning, Apr. 2017, 32 pp.
Zeiler et al., "Visualizing and Understanding Convolutional Networks," European Conference on Compute Vision, Sep. 2014, 16 pp.
Zhao et al., "Interactive Exploration of Implicit and Explicit Relations in Faceted Datasets," IEEE Transactions on Visualization and Computer Graphics, vol. 19, No. 12, Dec. 2013, 10 pp.
Zhu et al., "A Stochastic Grammar of Images," Foundations and Treads® in Computer Graphics and Vision, vol. 2 No. 4, Jan. 2006, 104 pp.
Zhu et al., "Aligning Books and Movies: Towards Story-Like Visual Explanations by Watching Movies and Reading Books," Proceedings of the IEEE International Conference on Computer Vision, Dec. 2015, 9 pp.
Zhu et al., "Unpaired Image-to-Image Translation Using Cycle-Consistent Adversarial Networks," IEEE International Conference on computer Vision (ICCV), ArXiv, Nov. 2018, 18 pp.

* cited by examiner

HYBRID HUMAN-ASSISTED DIALOGUE SYSTEM

This application claims the benefit of Greece Patent Application 20220100141, filed 16 Feb. 2022, and U.S. Provisional Patent Application 63/268,353, filed 22 Feb. 2022, the entire content of each is incorporated herein by reference.

TECHNICAL FIELD

The disclosure relates to computer speech generation and speech recognition.

BACKGROUND

Interactive voice response (IVR) and similar dialogue systems automatically conduct an interactive dialogue with a user. Such systems may switch, or connect, to a human agent when requested by the user.

SUMMARY

In general, the disclosure describes techniques for enhancing interaction with automatic dialogue systems, using a human-in-the-loop design. An automated dialogue system, according to this disclosure, may enable human-supported interventions, where the automated system still conducts most of the interaction but enables a human agent to assume control of the dialogue and assist, if deemed necessary, so that the user may continue the interaction with little interruption or frustration. In some examples, the user of the dialogue system of this disclosure may not realize that there was a problem, and that the interaction is being or has switched from an automated dialogue system to a human. In some examples, the automated dialogue system of this disclosure may also automatically switch back to machine interaction when the human agent has resolved the situation.

In an example, the disclosure describes a computing system for automatically integrating a human agent and an automated dialogue system to respond to voice inputs from a user, the system comprising processing circuitry having access to a storage device, the processing circuitry and storage device configured to execute: an automatic speech recognition (ASR) module and configured to receive and interpret the voice inputs from the user during a conversation session with the user; a text-to-speech (TTS) module and configured to generate a speech output for the conversation session with the user, the speech output being for output at an audio device; a dialogue management module and configured to apply a machine learning model, the machine learning model trained to a conversation domain, to the interpreted voice inputs to determine a dialogue state of the conversation session with the user; and an evaluation module and configured to determine a capability of the automated dialogue system to continue the conversation with the user based on one or more confidence measures; wherein, in response to determining, based on the indication from the evaluation module, that the automated dialogue system does not have the capability to continue the conversation session with the user, the processing circuitry and storage device are configured to provide a seamless transition to the human agent.

In other examples, the disclosure describes a non-transitory computer-readable storage medium comprising instructions that, when executed, cause processing circuitry of a computing system to: receive and interpret, by an automatic speech recognition (ASR) module, voice inputs from a user during a conversation session with the user; generate a speech output, by a text-to-speech (TTS) module, for the conversation session with the user, wherein the speech output is configured for output at an audio device; apply, by a dialogue management module, a machine learning model to the interpreted voice inputs, wherein the machine learning model is trained to a conversation domain, determine, by the dialogue management module, a dialogue state of the conversation session with the user based on applying the machine learning model to the interpreted voice inputs; determine, by an evaluation module based on one or more confidence measures, a capability of the automated dialogue system to continue the conversation with the user; and in response to determining, based on an indication from the evaluation module, that the automated dialogue system does not have the capability to continue the conversation session with the user, provide a seamless transition to a human agent.

In other examples, the disclosure describes a method of automatically integrating a human agent and an automated dialogue system to respond to voice inputs from a user, the method comprising: receiving and interpreting, by an automatic speech recognition (ASR) module of a computing system, voice inputs from a user during a conversation session with the user; generating a speech output, by a text-to-speech (TTS) module of a computing system, for the conversation session with the user, wherein the speech output is configured for output at an audio device; applying, by a dialogue management module of a computing system, a machine learning model to the interpreted voice inputs, wherein the machine learning model is trained to a conversation domain, determining, by the dialogue management module, a dialogue state of the conversation session with the user based on applying the machine learning model to the interpreted voice inputs; determining, by an evaluation module of a computing system and based on one or more confidence measures, a capability of the automated dialogue system to continue the conversation with the user; and in response to determining, based on an indication from the evaluation module, that the automated dialogue system does not have the capability to continue the conversation session with the user, providing a seamless transition to the human agent.

The details of one or more examples of the disclosure are set forth in the accompanying drawings and the description below. Other features, objects, and advantages of the disclosure will be apparent from the description and drawings, and from the claims.

DETAILED DESCRIPTION

Automated Interactive Voice Response (IVR) and dialogue systems may provide services to users in a wide variety of applications. Some examples may include taking phone orders for food, goods, and some services, confirming or changing appointments for medical services, banking and other financial services, home repair services, technical support, and other customer service situations, and so on. In some examples, the automated system may receive user input that the automated system is unable to process, and a human agent needs to intervene to address the customer request and remediate the problem. However, for many automated systems, the transition to a human agent may be disjointed and discordant. In examples of these other types of automated systems, the customer needs to start from scratch and explain his/her request to the human agent. In some examples, the explanation may repeat the same information just provided to the automated system. This disjointed transition situation may result in user frustration and damage customer trust of the automated system. In some examples, this frustration may make it less likely for the customers to continue using the dialogue systems and the customer may turn elsewhere for service.

In contrast, an automated dialogue system according to this disclosure may enable a seamless integration of automated and human agents, which may reliably satisfy the requests from customers. In some examples, the customer may not be aware of switching between the automated response and human assisted response. The automated dialogue system of this disclosure may take two approaches to provide this seamless integration. In a first approach, the automated agent may act and sound like a specific human agent. The system of this disclosure may create a text to speech (TTS) component using voice cloning for a specific human agent, or human agents, which may imitate the natural pace, pattern, intonation and so on for the specific human agent. In this manner, should the automated dialogue system switch to the human agent, the user hears the same voice as the automatically generated TTS responses. In a second approach, the human agent's speech may be reproduced through the TTS automated voice. Should the automated dialogue system receive an input that it cannot process, the human agent may assist by speaking into an automatic speech recognition (ASR) system, which will be followed by TTS to translate the sentences from the human agent into the voice of the TTS while keeping the original tone, timber, pacing and intonation. The automated system will use conversational intelligence rules relevant to floor-holding and turn-taking in order to facilitate natural transition to the human agent. More information regarding prosodic TTS may be found in International Application PCT/US2020/067381, filed 29 Dec. 2020 and regarding conversational intelligence may be found in International Application PCT/US 2020/031918, filed 7 May 2020, the entire contents of each of which are incorporated herein by reference.

For either the first or second approach, the automated dialogue system of this disclosure may include dialogue analysis to determine when to switch from the automated system to human agent. The dialogue analysis may include determining when to switch based on a confidence level that they automated system may be able to handle a situation or may need human assistance. In some examples, processing circuitry of the automated dialogue system may execute a statistical model configured to predict the likelihood of an erroneous system response based on, for example prior context, dialogue state, generated output content for TTS and recognized user input. The dialogue analysis may also include determining dialogue state and communicating the dialogue state to the human agent so the human agent may seamlessly assist in the transaction.

In some examples, when the human agent has resolved the situation, the automated dialogue system of this disclosure may also automatically switch back to the machine interaction. In contrast to other dialogue systems, the automated dialogue system of this disclosure may take over the interaction with the user the based on the dialogue state of the conversation session between the human agent and the user after the human agent is ready to turn the conversational floor session back over to the automated dialogue system. In this manner, unlike other types of dialogue systems, which may only store a dialogue state of the most recent automated interaction, the system of this disclosure may monitor the dialogue between the human agent and the user and automatically determine the current dialogue state based on interactions between the human and the user.

In one implementation, to take back the conversational floor from the human agent, the system processing circuitry may predict the current dialogue state based on previous context (utterances), which may include speech from the human agent, as well as the previous context (utterance) from the user. In some examples, the human agent may also provide an input, e.g., via a user interface, to indicate the dialogue state as a starting point for the automated dialogue system of this disclosure to take over the conversational floor.

Figure 1A:
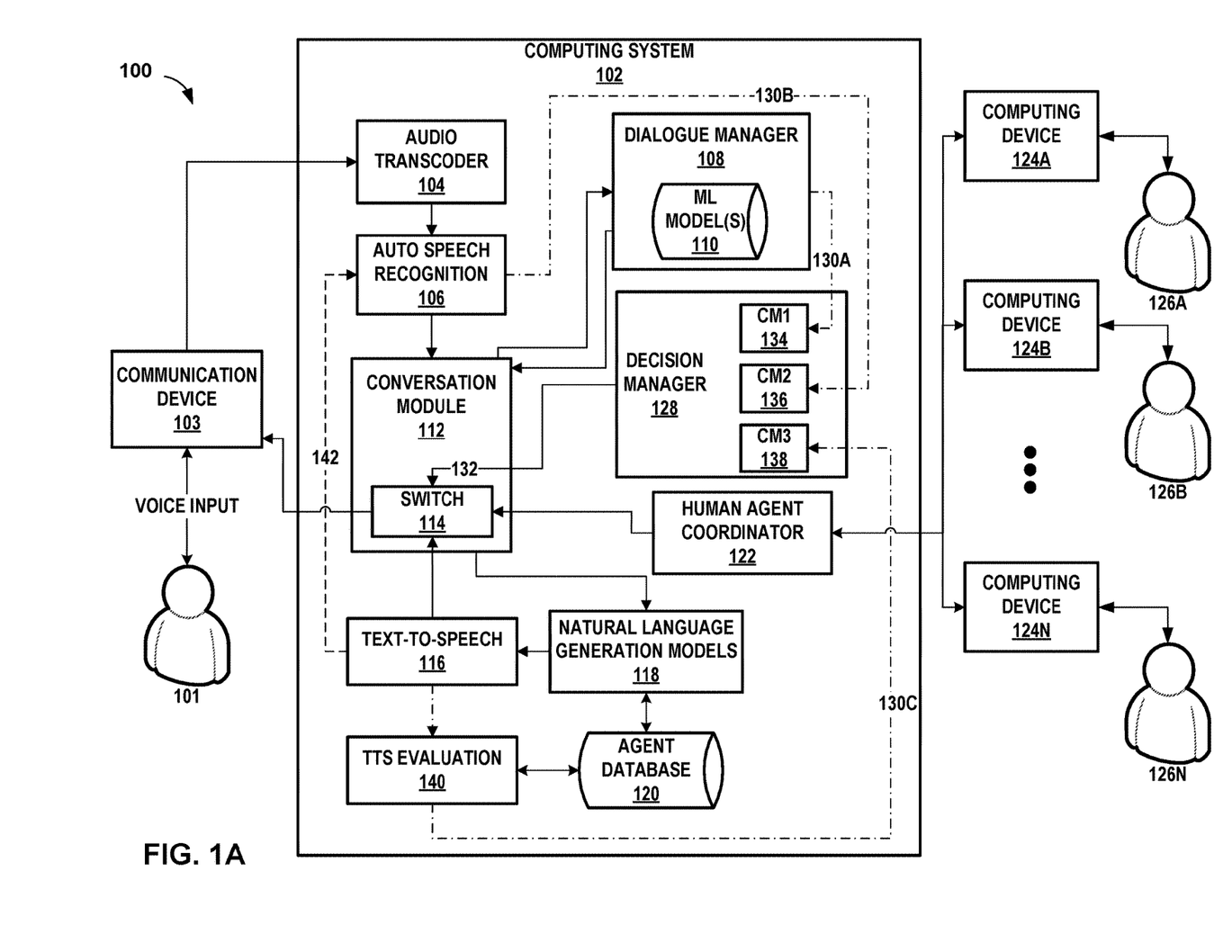
FIG. 1A is a block diagram illustrating an automatic interactive voice dialogue system configured to seamlessly integrate human agent assistance during a conversation session, according to techniques of this disclosure.

FIG. 1A is a block diagram illustrating an automatic interactive voice dialogue system configured to seamlessly integrate human agent assistance during a conversation session, according to techniques of this disclosure. System 100 illustrates the first approach of the two approaches described above. System 100 may receive voice inputs from user 101, digitize the received voice inputs and respond to the voice inputs. When processing circuitry of system 100 determines that the automated dialogue system is unable to reliably respond to the voice inputs from user 101, the processing circuitry may seamlessly turn the conversational floor over to a human agent. In other words, system 100 may manage a three-way conversation between user 101, the automated dialogue system and a selected human agent while presenting a two-way conversation with user 101 to provide a smooth interaction, avoid user frustration and satisfy the needs of the user. Said another way, system 100 may conduct a two-way conversation between user 101 and either a selected human agent, e.g., human agent 126B, or an avatar for human agent 126B (the automated dialogue system), where at any particular time either the human agent or the avatar is "hidden" or not actively participating in the conversation.

System 100 in the example of FIG. 1A includes computing system 102, communication device 103, or a connection to communication device 103, as well as one or more computing devices 124A, 124B through 124N configured to interact with human agents 126A, 126B through 126N (collectively human agents 126). Communication device 103 may include a microphone for audio input, an audio output device, e.g., a speaker, one or more cameras as well as other communication circuitry. In some examples, communication device 103 may be a device for user 101, such as a mobile phone, tablet computer, or other computing device, such as a hearing aid with communication circuitry. Computing system 102 may include communication circuitry to connect to communication device 103 either directly or via a wired or wireless network (not shown in FIG. 1A).

Computing system 102 may include conversation module 112, dialogue manager 108, audio transcoder 104, automated speech recognition (ASR) 106, text-to-speech module (TTS) 116, natural language generation (NLG) module 118, human agent coordinator 122, TTS evaluation module 140 and agent database 120.

Computing system 102 of system 100 may include processing circuitry configured to execute programming instructions stored at one or more memory locations (not shown in FIG. 1A) to perform the functions described for system 100. The modules and functions described for the example of FIG. 1A are shown to simplify the description and may be organized in a manner different than shown in the example of FIG. 1A. For example, decision manager 128, TTS evaluation module 140 and/or other components may be included with conversation module 112 or in dialogue manager 108 rather than being a separate module as shown. In some examples, a single processor may execute all the functions described for system 100. In other examples, separate processing circuitry may execute the functions for the modules as described. Dialogue manager 108 may also be referred to as dialogue management module 108 in this disclosure. Example hardware components for a computing system, such as computing systems 102 and 152, are described with respect to computing system 202 of FIG. 2. A computing system may include one or more computing devices, such as real or virtual servers, connected by a network. Various components of computing system 202 may be distributed among the one or more computing devices and communicate to implement techniques described in this disclosure.

Audio transcoder 104 may receive voice input from user 101 via communication device 103 and digitize the voice input. ASR 106 may include processing circuitry and configured to receive and interpret the voice inputs from the user during a conversation session with the user. In some examples, ASR 106 may produce individual sound waveforms, textual representations, or any combination of both for the voice input such as phrases, individual words, phonemes, non-words, and any combination.

Conversation module 112 may include processing circuitry and may receive input data comprising the voice input from user 101. In some examples, conversation module 112 may perform an analysis of the flow of speech coming from the user, such as timing information for prosodic analysis as well as to determine the length of a pause from user 101 that may indicate a final word in a completed thought from the user, which may indicate the user is yielding the conversation floor.

Dialogue management module 108 may include processing circuitry and be configured to apply machine learning model 110 trained to a conversation domain, to the interpreted voice inputs from user 101 to determine a dialogue state of the conversation session with user 101. In some examples, dialogue management module 108 may be configured to operate with a hybrid approach of a rule-based engine and the trained machine learning model 110 to analyze and make decisions on the dialogue state of the conversation session with the user.

In some examples, dialogue management module 108 may be one several instances, or may be trained set of models on a particular conversation domain, such as travel, medical, finance and so on. Some examples of conversation domains may include one of: taking orders, confirming appointments, eliciting information, requesting permission to release user information and other similar conversation domains. In some examples, machine learning (ML) model(s) 110 may be trained to the conversation domain with a set of in-domain phrases. In some examples, the set of in-domain phrases is based on a respective set of templates for the conversation domain. For example, training ML model(s) 110 on the topic for the conversation domain and a template set of appropriate questions and responses with slots to populate in various facts from the current dialogue within that particular conversation domain.

Dialogue manager 108 may coordinate with conversation module 112. Conversation module 112 may monitor and assist with a flow of speech in the conversation session with user 101, which may generally apply across all conversation domains of human topics.

Conversation module 112 may cooperate with natural language generation module 118 and text-to-speech module 116. TTS 116 may include processing circuitry and be configured to generate a speech output for the conversation session with user 101, where the speech output is for output at an audio device, e.g., included with communication device 103. Agent database 120 may be trained with language characteristics from human agents 126. In other words, agent database 120 may include data elicited from one or more human agents 126 for voice-cloning training TTS 116 module to a specific human agent, such that speech output to user 101 matches a voice of the respective human agent for the in-domain phrases. In some examples, the model adaption may include recorded audio from the human agent marked with one or more unique annotation symbols provided as input during the voice-cloning training. The automated dialogue system may be configured to produce sentences for output to user 101 at run time and apply predetermined prosodic characteristics to the sentences within each template of the set of templates for the conversation domain to help the output sound like the specified human agent.

In operation, system 100 may include an evaluation module, e.g., decision manager 128, comprising processing circuitry and configured to determine a capability of the automated dialogue system to continue the conversation with user 101. The evaluation module may make the determination based on one or more confidence measures, or some combination of two or more confidence measures. For example, in speech recognition, confidence measures (CM) may be used to evaluate reliability of recognition results. Decision manager 128 may include modules to evaluate any one of several aspects of the operation of system 100, such as confidence measure modules CM1 134, CM2 136 and CM3 138 as depicted in the example of FIG. 1A.

In some examples, confidence measure CM1 134 of decision manager 128 may receive an indication from dialogue manager 108 of a capability for dialogue management module 108 to act on a particular voice input of the voice inputs from user 101. In some examples dialogue management module 108 may calculate the confidence measurement and output the calculated confidence to CM1 134. In other examples, dialogue manager 108 may output data to CM1 134, which may perform the confidence measurement calculation. The output indication may include a confidence measure based on one or more of: prior context of the conversation session, dialogue state of the conversation session, and the respective voice input from user 101. For example, the voice input from user 101 may be garbled, speak with an accent that is difficult for ASR 106 to recognize, user 101 may speak a phrase that is unexpected given the determined dialogue state, or some other factor may cause a low confidence measure. In some examples, the confidence measure may be based on whether the respective voice input is within the conversation domain. In some examples, the model adaption is weighted so that the model adaption over-fits on the elicited data for a particular conversation domain at the expense of more general phrases, such that the model adaption is configured to output one or more phrases of the set of in-domain phrases and configured such that the model adaption may not support more general out-of-domain phrases in some situations. For example, dialogue manager 108 may be overtuned to setting up medical appointments, and user 101 may provide voice inputs related to pharmacy prescriptions, or some other out of domain topic, which may generate a poor confidence measure. Dialogue manager 108 may provide a poor confidence score if the processing circuitry determines that such out-of-domain phrases may be what should apply to a current dialogue state.

In some examples, the confidence measure from dialogue manager 108 to CM1 134 may be generated by a statistical model. The statistical model may be based on data that includes successful and erroneous responses from dialogue management module 108 and may predict a likelihood of an erroneous response based on the prior context of the conversation session, the dialogue state, and the respective voice input.

In some examples, CM2 136 of decision manager 128 may receive an indication from ASR module 106 of an interpretation confidence measure, wherein the interpretation confidence measure indicates an evaluation of ASR module 106 to correctly interpret a particular voice input of the voice inputs from user 101. ASR module 106 may use any one or more of a variety of techniques to determine a confidence measurement.

In some examples, CM3 138 may receive an indication of whether TTS module 116 will generate an output that matches a respective human agent of human agents 126. For example, system 100, e.g., human agent coordinator 122, may select human agent 126A for interaction with a particular user 101. The automated dialogue system executed by computing system 102 may respond to voice inputs from user 101 using voice outputs based on human agent 126A. In some examples, the indication to CM3 138 may include a confidence measure based on whether the generated output comprises a response within capabilities for TTS module 116 was trained. For example, if the conversation domain is for taking food orders, but user 101 begins asking question about a menu item that the system did not see during training, the confidence measure to CM3 138 may reflect a poor confidence score. In some examples, a business may have changed or added some menu items and the TTS module for a particular human agent, e.g., agent 126B, may not yet have been trained to output the new menu items, resulting in a low confidence score.

In some examples, the confidence measure to CM3 138 may include a comparison of the generated output of TTS 116 to speaker verification for the respective human agent. For example, processing circuitry of computing device 102 may perform a speaker identification check of the generated output from TTS 116 to ensure the generated output will sound like the respective human agent. In some examples TTS 116 may perform the confidence measure and output to decision manager 128. In other examples an external evaluation module, e.g., TTS evaluation 140, may include evaluation tests for TTS output to user 101. In some examples, output from TTS 116 (142) may go to ASR 106. ASR 106 may generate an interpretation confidence measure and provide the confidence measure to decision manager 128.

Decision manager 128 may evaluate the various confidence measures to determine whether the automated dialogue system is capable of continuing the conversation with user 101. In some examples, if any one or more confidence measures satisfies "poor confidence" threshold, decision manager 128 may output an indication to conversation module 112 that a human agent should step in and take over the conversation floor. In other examples, decision manager 128 may perform some calculation on the received confidence measures to determine an overall confidence. In some examples, computing system 102 may attempt to clarify a voice input from user 101, for example by asking user 101, via TTS 116, to repeat or rephrase the previous voice input. In some examples the repeated or clarified voice input from user 101 may improve one or more confidence measures.

Conversation module 112 may receive from the evaluation module, decision manager 128, an indication of the capability of the automated dialogue system to continue the conversation session with user 101. In response to determining, based on the indication from decision manager 128, that the automated dialogue system does not have the capability to continue the conversation session with the user, the processing circuitry of computing system 102 may provide a seamless transition to the selected human agent, e.g., human agent 126A.

Conversation module 112 may maintain control of a conversational floor of the conversation session with user 101, such as by generating an utterance for user 101 and cause TTS module 116 to output the utterance to the user. Some example utterances may be verbal, such as "just a second" or "let me check" and so on. Other example utterances may be non-verbal, such as "um" "uh", "hmmm" and so on. Conversation module 112 may pause further response to the user for a specified duration and check whether the human agent is available to assist. In other words, conversation module 112 may generate an utterance that is a beyond-the-words conversational cue including a non-lexical vocal cue for TTS 116 to output to user 101.

In some examples, conversation module 112 may cause dialogue management module 108 to pass information to the selected human agent, e.g., human agent 126A, which may include the dialogue state of the conversation session. In this manner, unlike other types of voice systems, the human agent will not need to ask questions of the user to get information that the automated dialogue system already determined. Instead, the human agent may be prepared, based on the dialogue state, and prior context of the conversation session, to seamlessly take over the conversation floor. In response to determining the human agent is available, conversation module 112, or some other portion of computing system 102, may output a directive to the selected human agent to assume the conversational floor of the conversation session with user 101. In some examples, decision manager 128, may switch (114) the output to user 101 from TTS 116 to the respective computing device for the selected human agent, e.g., computing device 124A for human agent 126A. User 101 may then interact directly with the human agent to continue the conversation session.

In some examples, the selected human agent may not be available, e.g., the human agent may be interacting with another user. The pause for the specified duration, such as a few seconds, e.g., five or fewer seconds, may not be long enough to engage the selected human agent. Therefore, in response to determining that the human agent is unavailable for the first specified duration, the processing circuitry of computing system 102 may generate a first delay utterance and cause the TTS module to output the first delay utterance to the user. In some examples, the delay utterance may include more information that the first utterance, e.g., "I'm still checking," "please give me another moment," or similar phrases. The delay utterance may allow the automated dialogue system to retain the conversational floor and pause further response to the user for a second specified duration and check again whether the human agent is available to assist. In some examples, the second specified duration may be longer than the first duration e.g., a second or a few seconds longer. In response to determining that the human agent is unavailable for the second specified duration, processing circuitry of computing system 102 may execute programming instructions to generate a second delay utterance to user 101. In some examples, the second delay utterance may include an apology or similar phrasing to allow more time for the human agent to intercede, while maintaining the conversational floor with user 101.

As noted above when the human agent has resolved the situation, the automated dialogue system of this disclosure may also automatically switch back to the machine interaction, e.g., via human agent coordinator 122. Processing circuitry of computing system 102 may monitor the dialogue between the human agent and user 101 and automatically determine the current dialogue state based on interactions between the human and the user and take over the conversation based on this determined dialogue state. In some examples, the dialogue management module, dialogue manager 108 may determine that the human agent has released control of the conversation session. The processing circuitry may predict a current dialogue state of the conversation session based on context provided by previous utterances output to user 101, such as speech from the human agent, as well as previous utterances from the user 101 both during the conversation with the human agent and in some examples, including utterances during interaction with the automated dialogue system. The processing circuitry may take over the conversation from the human agent and output future utterances during the conversation session based on the predicted current dialogue state. The future utterances may retain the context of the conversation session up to the current dialogue state. In some examples, the processing circuitry may assume prior dialogue states as hidden variables as part of predicting the current dialogue state. In other examples, the processing circuitry may predict the current dialogue state using other techniques.

Figure 1B:
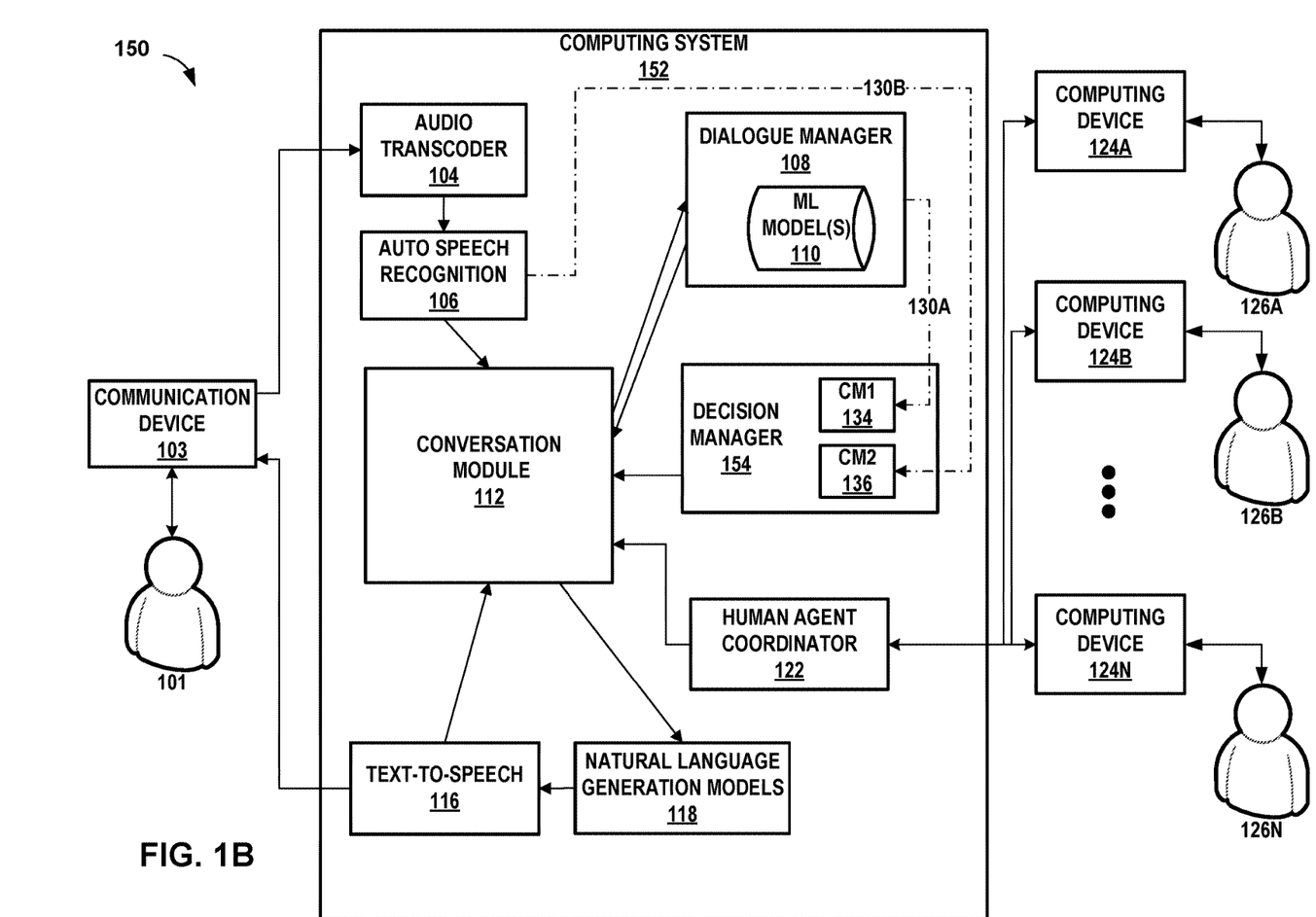
FIG. 1B is a block diagram illustrating an automatic interactive voice dialogue system configured to convert human agent assistance into voice output generated by the automatic interactive voice dialogue system, according to techniques of this disclosure.

FIG. 1B is a block diagram illustrating an automatic interactive voice dialogue system configured to convert human agent assistance into voice output generated by the automatic interactive voice dialogue system, according to techniques of this disclosure. System 150 describes one possible example implementation of the second approach for an automated dialogue system described above. For this second approach, the human agent's speech may be reproduced through automated voice of TTS 116. Should the automated dialogue system receive an input that it cannot process, the human agent may assist by speaking into an automatic speech recognition (ASR) system, e.g., including with computing devices 124. The digitized speech from one of human agents 126 will be input to TTS 116 to translate the sentences from the human agent into the voice of TTS 116, while keeping the original tone, timber, pacing and intonation of the voice output to user 101 consistent.

System 150 and computing system 152 are examples of system 100 and computing system 102 described above in relation to FIG. 1A. Similar components may have the same or similar functions and characteristics as described above in relation to FIG. 1A. System 150 may be implemented in a similar manner as described above for system 100, e.g., in some examples, computing system 152 may be trained to focus on a specific conversation domain, rather than be configured to generally operate in any conversation domain, which may also be referred to as conversational domain in this disclosure. In some examples, the second approach, described by FIG. 1B may be implemented on the same type of computing system as in FIG. 1A, e.g., on computing system 102, but with different programming instructions executed by the processing circuitry.

In the second approach computing system 152 may not need to provide a confidence measure that the output from TTS 116 will sound like the selected human agent. Therefore decision manager 154 of computing system 152 may only implement confidence measures CM1 134 and CM2 136, which have the same functions and characteristics as described above for system 100. Decision manager 154 may determine whether to have one of human agents 126 take over the conversational floor based on either one or some combination of CM1 134 and CM2 136. System 150 may engage any one of human agents 126, in contrast to system 100, because the output to user 101 is always via TTS 116 and using the same system voice. System 150 may therefore not use the voice cloning techniques to develop agent database 120 of system 100.

Otherwise computing system 152 may operate in the same manner to system 100, as described above. For example, system 150 in the example of FIG. 1B includes computing system 152, communication device 103, or a connection to communication device 103, as well as one or more computing devices 124A, 124B through 124N configured to interact with human agents 126. As with system 100, communication device 103 may include a microphone for audio input, an audio output device, e.g., a speaker, one or more cameras as well as other communication circuitry. Computing system 152 may include communication circuitry to connect to communication device 103 either directly or via a wired or wireless network (not shown in FIG. 1B).

Computing system 152 may include conversation module 112, dialogue manager 108, audio transcoder 104, ASR 106, TTS 116, natural language generation (NLG) module 118, and human agent coordinator 122. In other examples, system 152 may include more or few components than shown in FIG. 1B, and may organized the components in a different manner, as described above in relation to FIG. 1A.

The seamless transition between a human agent and the automated system may provide advantages over other examples of dialogue systems. Other examples of dialogue systems may transition from an automated system to a human agent in a cumbersome manner that may user annoyance, and in some examples, may cause a user to avoid using the automated system. Some transitions may be explicit, such as the automated system may output a sentence to a user such as, "let me transfer you to an agent to assist you further." Other examples of explicit, non-seamless transition may include a human agent taking over the conversation and asking the user for information the user has already provided, e.g., the user's name, reason for the call, what was the last topic of conversation with the automated system, and similar information. Other non-seamless transitions may be implicit, such as the voice of the human agent may be different from that of the automated system, even if the automated system provides the human agent background information from the user to the human agent. The timbre, tone, conversational pacing, and similar characteristics may differ from the automated system, and therefore may be perceived as disjointed by the user.

In contrast, the techniques included in system 100 may provide improvements to an automated computing system. As noted above system 100 may manage a three-way conversation between user 101, the automated dialogue system and a selected human agent 126 while presenting a two-way conversation with user 101 to provide a smooth and seamless interaction.

Figure 2:
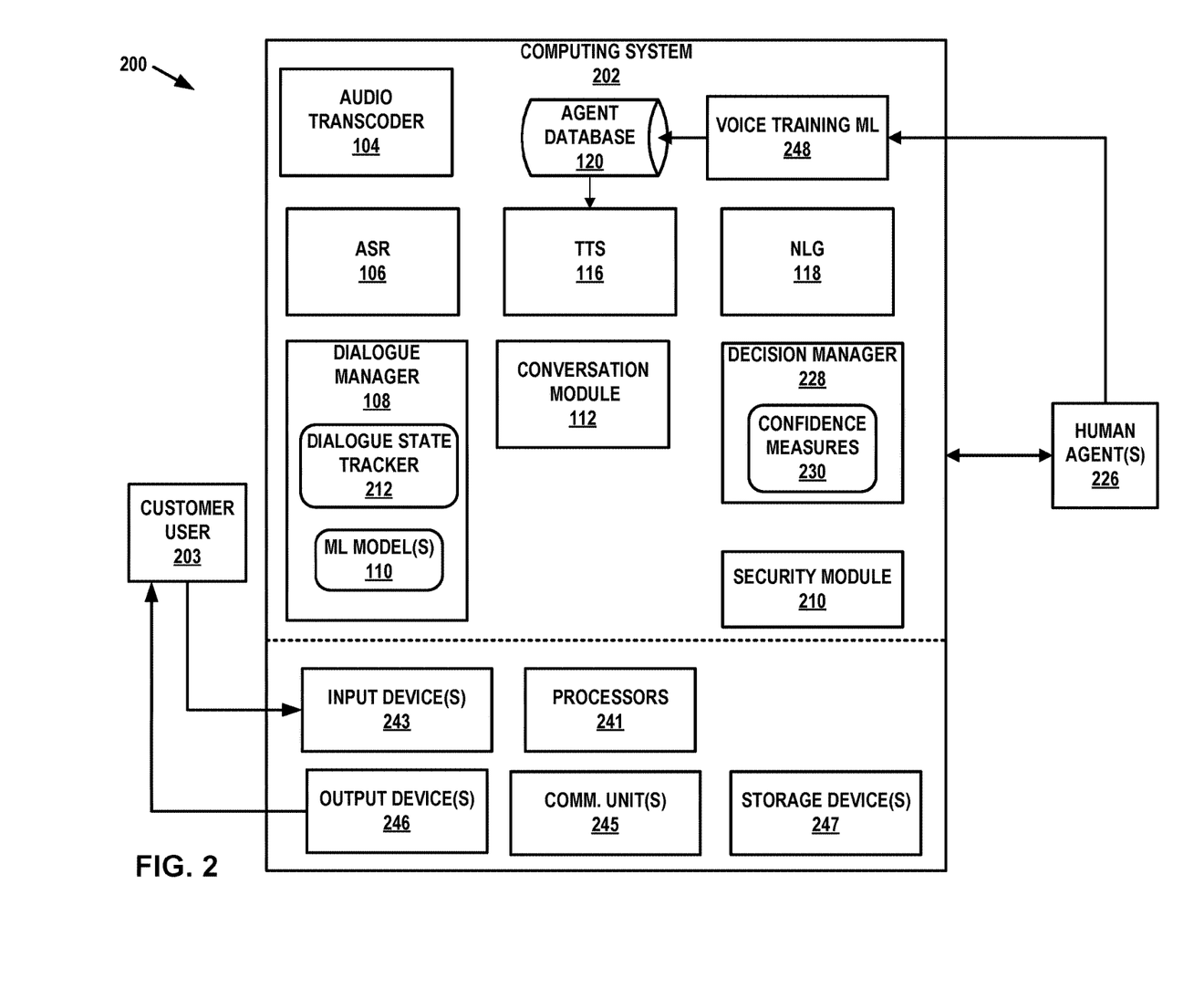
FIG. 2 is a block diagram illustrating an example implementation of a computing system configured to execute an automatic interactive voice dialogue system configured to seamlessly integrate human agent assistance during a conversation session, according to techniques of this disclosure.

FIG. 2 is a block diagram illustrating an example implementation of a computing system configured to execute an automatic interactive voice dialogue system configured to seamlessly integrate human agent assistance during a conversation session, according to techniques of this disclosure. In the example of FIG. 2, computing system 202 includes one or more input devices 243, one or more processors 241, one or more output devices 246, one or more storage devices 247, and one or more communication units 245. In some examples, computing system 202 represents a cloud computing system, server farm, and/or server cluster (or portion thereof) that provides services to client devices and other devices or systems. In other examples, computing system 202 may represent or be implemented through one or more virtualized compute instances (e.g., virtual machines, containers) of a data center, cloud computing system, server farm, and/or server cluster.

One or more of the devices, modules, storage areas, or other components of computing system 202 may be interconnected to enable inter-component communications (physically, communicatively, and/or operatively). In some examples, such connectivity may be provided by through communication channels, a system bus, a network connection, an inter-process communication data structure, or any other method for communicating data.

One or more processors 241 of computing system 102 may implement functionality and/or execute instructions associated with computing system 102 or associated with one or more modules illustrated herein and/or described below. One or more processors 241 may be, may be part of, and/or may include processing circuitry that performs operations in accordance with one or more aspects of the present disclosure. Examples of processors 241 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein. One or more processors 241 may be distributed among multiple servers located in a public, private, and/or hybrid cloud, and/or on-prem.

One or more communication units 245 of computing system 102 may communicate with devices external to computing system 102 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 102 may transmit and/or receive satellite signals on a satellite network such as a Global Positioning System (GPS) network. Examples of communication units 245 include a network interface card (e.g., an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 243 may represent any input devices of computing system 102 not otherwise separately described herein. One or more input devices 243 may generate, receive, and/or process input from any type of device capable of detecting input from a human or machine. For example, one or more input devices 243 may generate, receive, and/or process input in the form of electrical, physical, audio, image, and/or visual input (e.g., peripheral device, keyboard, microphone, camera), such as communications device 103 described above in relation to FIGS. 1A and 1B.

One or more output devices 246 may represent any output devices of computing system 102 not otherwise separately described herein. One or more output devices 246 may generate, receive, and/or process input from any type of device capable of detecting input from a human or machine. For example, one or more output devices 246 may generate, receive, and/or process output in the form of electrical and/or physical output (e.g., peripheral device, actuator).

One or more storage devices 247 within computing system 102 may store information for processing during operation of computing system 102. Storage devices 247 may store program instructions and/or data associated with one or more of the modules described in accordance with one or more aspects of this disclosure. One or more processors 241 and one or more storage devices 247 may provide an operating environment or platform for such modules, which may be implemented as software, but may in some examples include any combination of hardware, firmware, and software. One or more processors 241 may execute instructions and one or more storage devices 247 may store instructions and/or data of one or more modules. The combination of processors 241 and storage devices 247 may retrieve, store, and/or execute the instructions and/or data of one or more applications, modules, or software. Processors 241 and/or storage devices 247 may also be operably coupled to one or more other software and/or hardware components, including, but not limited to, one or more of the components of computing system 102 and/or one or more devices or systems illustrated as being connected to computing system 102. One or more storage devices 247 may be distributed among multiple storage servers located in a public, private, and/or hybrid cloud, and/or on-prem.

In some examples, one or more storage devices 247 are temporary memories, meaning that a primary purpose of the one or more storage devices is not long-term storage. Storage devices 247 of computing system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 247, in some examples, also include one or more computer-readable storage media. Storage devices 247 may be configured to store larger amounts of information than volatile memory. Storage devices 247 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Computing system 202 may provide the functions for the automated dialogue system of this disclosure under either or both of approaches one and two described above. Components of computing system 202, e.g., audio transcoder 104, ASR 106, dialogue manager 108, TTS 116, conversation module 112, NLG 118 and agent database 120 perform the same functions and have the same descriptions as described above in relation to FIGS. 1A and 1B. Dialogue manager 108 may determine and track the dialogue state as described above for example with dialogue state tracker 212. The audio recordings based in voice cloning in agent database 120 may be created and stored with voice training machine learning module 248. Decision manager 228 is an example of decision manager 128 and decision manager 154 described above in relation to FIGS. 1A and 1B respectively and may include confidence measures 230, e.g., based on ASR 106 confidence, TTS 116 confidence and decision manager 228 confidence that the automated dialogue system can continue a conversation session with a customer user 203.

In some examples, a computing system executing the automated dialogue system of this disclosure may also include security module 210. In some examples, security module 210 may include technology that protects the human agent data and trained TTS voice, so that the TTS may not be used for other purposes, e.g., deepfakes. Security module 210 may be configured to avoid unethical uses of this system. In some examples, the constrained conversation domain of the elicited data for voice cloning may provide protection to ensure that, since if someone attempts to use the system for any other domain except the target in-domain use, a low confidence score may prohibit producing TTS output without human agent 226 intervention.

Figure 3:
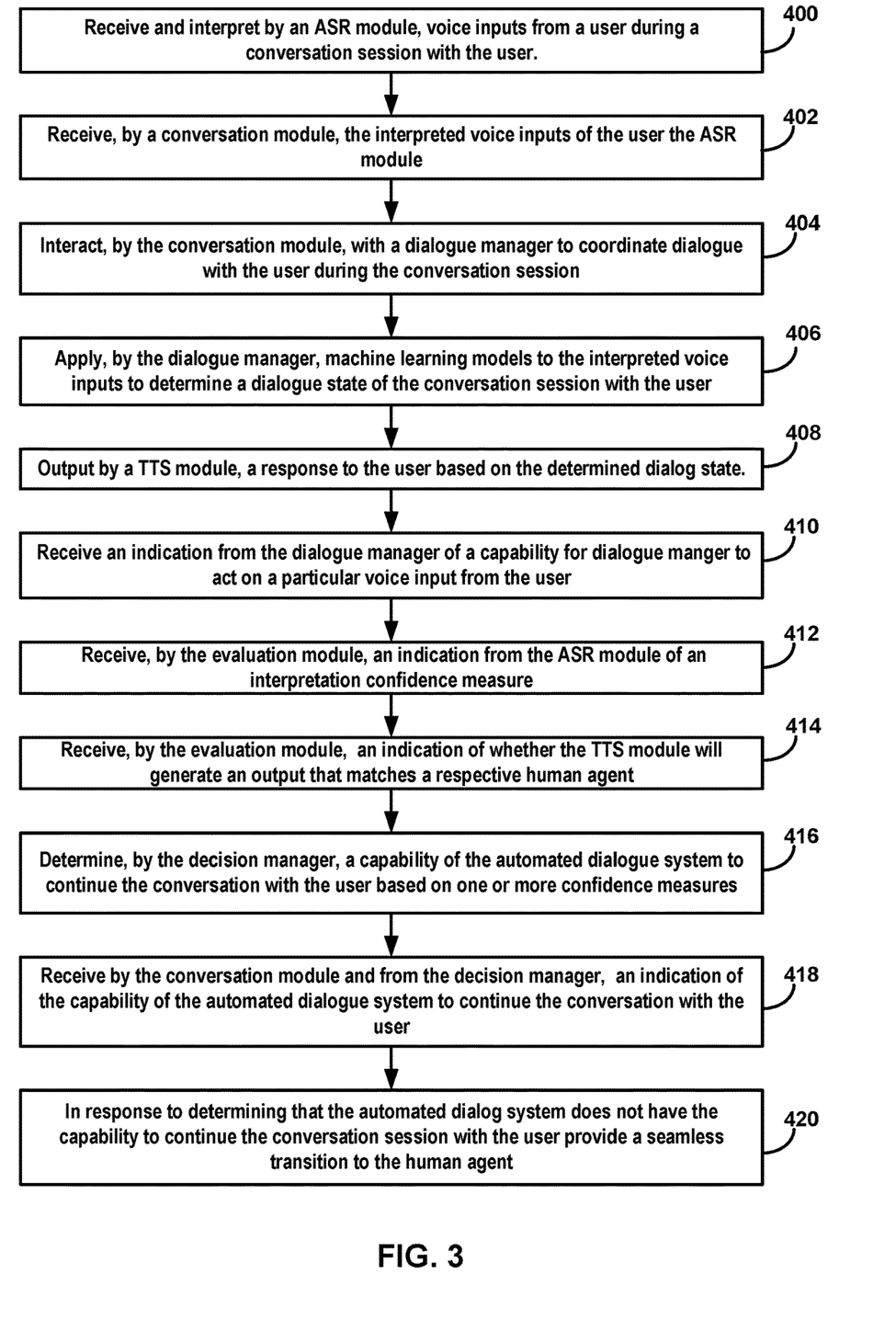
FIG. 3 is a flow chart illustrating an example operation of the automatic interactive voice dialogue system of this disclosure, according to techniques of this disclosure.

FIG. 3 is a flow chart illustrating an example operation of the automatic interactive voice dialogue system, according to techniques of this disclosure. The steps of the operation of FIG. 3 may focus on the first approach, to simplify the description, and be described in terms of FIGS. 1A and 1B.

Processing circuitry of computing system 102, e.g., one or more of processors 241 depicted in FIG. 2, executing the functions of ASR 106, may receive and interpret voice inputs from user 101 during a conversation session with the user (400). The conversation session may be in the conversation domain of taking an order for parts, services, food, goods, pharmacy prescription refills and similar items; or setting up appointments for auto repair, home repair, medical services, taking reservations for dining, seat reservations; or banking or other financial interactions between a financial institution and a user; technical support; interactive self-service; training or education; guided selling; or any other conversation domain where an automated dialogue system may interact with a user.

Conversation module 112 may receive the interpreted voice inputs of user 101 from ASR 106 (402) and interact with dialogue management module 108 to coordinate dialogue with user 101 during the conversation session (404). Dialogue management module 108 may apply machine learning models 110 to the interpreted voice inputs to determine a dialogue state of the conversation session with user 101 (406). Machine learning models 110 may be trained to the specified conversation domain, as described above in relation to FIG. 1A. In some examples the same processing circuitry of computing system 102 and 152, e.g., processors 241 of FIG. 2, that perform the functions of ASR 106 may execute the programming instructions to perform the functions of conversation module 112 and dialogue management module 108. In other examples separate processors of computing system 102, or 152, may perform the functions of the various modules.

Dialogue management module 108 may cause TTS 116 to output a response to user 101 based on the determined dialogue state. TTS 116 may generate a speech output for the conversation session with user 101 for output at an audio device, e.g., communications device 103 (408).

In some examples, decision manager 128 may receive an indication, CM1 134, from dialogue management module 108 of a capability for dialogue management module 108 to act on a particular voice input of the voice inputs from user 101 during the conversation session (410). The indication may include a confidence measure based on one or more of: prior context of the conversation session, dialogue state of the conversation session, and the respective voice input from the user, as described above in relation to FIG. 1A. In some examples, the confidence measure is based on whether the respective voice input is within the conversation domain.

Decision manager 128 may also receive an indication CM2 136 from ASR module 106 of an interpretation confidence measure, which may indicate an evaluation of ASR module 106 to correctly interpret a particular voice input of the voice inputs from the user (412). In some examples, decision manager 128 may receive an indication CM3 138 of whether TTS module 116 will generate an output that matches a respective human agent (414), e.g., for the first approach. The indication CM3 138 may be based on a confidence measure of whether the generated output comprises a response within the conversation domain, and/or an interpretation confidence measure generated by ASR module 106. In the example of the first approach, confidence measure CM3 138 may also include a comparison of the generated output to speaker verification for the respective human agent.

The evaluation module, e.g., decision manager 128, may determine a capability of the automated dialogue system to continue the conversation with user 101 based on one or more confidence measures from other components of computing system 102 (416). In some examples, conversation module 112 may receive from decision manager 128, an indication of the capability of the automated dialogue system to continue the conversation with the user (418), as described above in relation to FIGS. 1A and 1B. In response to determining, based on the indication from decision manager 128, that the automated dialogue system does not have the capability to continue the conversation session with the user, processing circuitry of computing system 102, or 152, may provide a seamless transition to the human agent (420). For the second approach, the processing circuitry may connect the human agent to TTS 116 as described above in relation to FIG. 1B. For either of the first approach or the second approach the processing circuitry, e.g., conversation module 112 may maintain control of a conversational floor of the conversation session with user 101 by generating an utterance for the user and cause the TTS module to output the utterance to the user. Conversation module 112 may pause further response to the user for a specified duration and check whether the human agent is available to assist and cause the dialogue management module to pass information to the human agent comprising the dialogue state of the conversation session. In response to determining the human agent is available, output a directive to the human agent to assume the conversational floor of the conversation session with the user. For the second approach, any of human agents 126 may take over the conversational floor and the conversation session.

In response to determining that the human agent is unavailable for the first specified duration, processing circuitry of the computing system may generate a first delay utterance and cause TTS module 116 to output the first delay utterance to user 101. The processing circuitry may pause further response to user 101 for a second specified duration and check again whether the human agent is available to assist. In response to determining that the human agent is unavailable for the second specified duration, generate a second delay utterance to the user. In some examples the second delay utterance comprises an apology, as described above in relation to FIG. 1A.

In one or more examples, the functions described above may be implemented in hardware, software, firmware, or any combination thereof. For example, the various components and modules of FIGS. 1A, 1B and 2, such as conversation module 112, auto speech recognition 106, audio transcoder 104, TTS 116, TTS evaluation 140, dialogue manager 108, decision manager 128, decision manager 154, conversation module 112, and other components may be implemented in hardware, software, firmware, or any combination thereof. If implemented in software, the various components and modules may be stored on or transmitted over, as one or more instructions or code, a computer-readable medium and executed by a hardware-based processing unit comprising processing circuitry. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), Flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, CPUs, ASICs, FPGAs, or other equivalent integrated or discrete logic circuitry. Accordingly, the term "processor" and "processing circuitry," as used herein, such as processors 241, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computing system for automatically integrating a human agent and an automated dialogue system to respond to voice inputs from a user, the system comprising: processing circuitry having access to a storage device, the processing circuitry and the storage device configured to execute:
    an automatic speech recognition (ASR) module configured to receive and interpret the voice inputs from the user during a conversation session with the user;
    a text-to-speech (TTS) module configured to generate a speech output for the conversation session with the user, the speech output being for output at an audio device;
    a dialogue management module configured to apply a machine learning model, the machine learning model trained to a conversation domain, to the interpreted voice inputs to determine a dialogue state of the conversation session with the user; and
    an evaluation module configured to determine a capability of the automated dialogue system to continue the conversation session with the user based on one or more confidence measures, and
    wherein, in response to determining, based on an indication from the evaluation module, that the automated dialogue system does not have the capability to continue the conversation session with the user, the processing circuitry and the storage device are configured to provide a seamless transition to the human agent, wherein the seamless transition to the human agent comprises automatically modifying the conversation session to include an agent device of the human agent.

2. The computing system of claim 1, wherein to provide the seamless transition to the human agent, the processing circuitry and the storage device are configured to perform one or more of:
 maintain control of a conversational floor of the conversation session with the user by generating an utterance for the user and cause the TTS module to output the utterance to the user;
 pause further response to the user for a specified duration and check whether the human agent is available to assist;
 cause the dialogue management module to pass information to the human agent comprising the dialogue state of the conversation session; or
 in response to determining the human agent is available, output a directive to the human agent to assume the conversational floor of the conversation session with the user.

3. The computing system of claim 2, wherein the processing circuitry and the storage device are configured to execute a conversation module configured to:
 receive, from the evaluation module, an indication of the capability of the automated dialogue system to continue the conversation session with the user;
 interact with the dialogue management module to coordinate dialogue with the user during the conversation session; and
 provide the seamless transition to the human agent.

4. The computing system of claim 1, wherein the evaluation module is configured to receive an indication from the ASR module of an interpretation confidence measure, wherein the interpretation confidence measure indicates an evaluation of the ASR module to correctly interpret a particular voice input of the voice inputs from the user.

5. The computing system of claim 1, wherein the evaluation module is configured to receive an indication from the dialogue management module of a capability for the dialogue management module to act on a particular voice input of the voice inputs from the user, wherein the indication comprises a confidence measure based on one or more of: prior context of the conversation session, the dialogue state of the conversation session, and the respective voice input from the user.

6. The computing system of claim 5, wherein the confidence measure is based on whether the respective voice input is within the conversation domain.

7. The computing system of claim 5,
 wherein the confidence measure is generated by a statistical model,
 wherein the statistical model is based on data that includes successful and erroneous responses from the dialogue management module, and
 wherein the statistical model is configured to predict a likelihood of an erroneous response based on one or more of: the prior context of the conversation session, the dialogue state, and the respective voice input.

8. The computing system of claim 1,
 wherein the evaluation module is configured to receive an indication of whether the TTS module will generate an output that matches a respective human agent, and
 wherein the indication comprises a confidence measure based on one or more of:
  whether the generated output comprises a response within the conversation domain,
  a comparison of the generated output to speaker verification for the respective human agent, or
  an interpretation confidence measure generated by the ASR module.

9. The computing system of claim 1, wherein the machine learning model is trained to the conversation domain with a set of in-domain phrases.

10. The computing system of claim 9,
 wherein the set of in-domain phrases is based on a respective set of templates for the conversation domain,
 wherein data is elicited from the human agent for voice-cloning training the TTS module to the human agent, and
 wherein model adaption is configured to cause the TTS module to generate the speech output of the in-domain phrases such that speech output matches a voice of the human agent for the in-domain phrases.

11. The computing system of claim 10,
 wherein the model adaption includes recorded audio from the human agent marked with one or more unique annotation symbols provided as input during the voice-cloning training, and
 wherein the system is configured to produce sentences for output to the user at run time and apply predetermined prosodic characteristics to the sentences within each template of the set of templates for the conversation domain.

12. The computing system of claim 11, wherein the model adaption is weighted so that the model adaption over-fits on the elicited data at an expense of more general phrases, such that the model adaption is configured to output one or more phrases of the set of in-domain phrases and configured such that the model adaption will not support more general out-of-domain phrases.

13. The computing system of claim 10,
 wherein the human agent is a first human agent of a set of human agents, and
 wherein the model adaption is further based on data elicited from each respective human agent of the set of human agents for voice-cloning training the TTS module.

14. The computing system of claim 1, wherein the conversation domain comprises one of: taking orders, making reservations, confirming appointments, eliciting information, and requesting permission to release user information.

15. The computing system of claim 1, wherein the dialogue management module is configured to provide instructions to the TTS module to generate the speech output based on the dialogue state of the conversation session.

16. The computing system of claim 1, wherein to determine the capability of the automated dialogue system to continue the conversation session with the user, the evaluation module is configured to:
 determine a confidence score indicating the capability of the automated dialogue system to continue the conversation session with the user; and
 compare the confidence score to a confidence threshold.

17. The computing system of claim 1, wherein the dialogue management module is configured to operate with a hybrid approach of a rule-based engine and the trained, machine learning model to analyze and make decisions on the dialogue state of the conversation session with the user.

18. The computing system of claim 1, wherein the dialogue management module is configured to:
  determine that the human agent has released control of the conversation session; and
  predict a current dialogue state of the conversation session based on context provided by:
    previous utterances output to the user, comprising speech from the human agent;
    previous utterances from the user; and
    output future utterances during the conversation session based on the predicted current dialogue state, such that the future utterances retain the context up to the current dialogue state.

19. A non-transitory computer-readable storage medium comprising instructions that, when executed, cause processing circuitry of a computing system to:
  receive and interpret, by an automatic speech recognition (ASR) module, voice inputs from a user during a conversation session with the user;
  generate a speech output, by a text-to-speech (TTS) module, for the conversation session with the user, wherein the speech output is configured for output at an audio device;
  apply, by a dialogue management module, a machine learning model to the interpreted voice inputs, wherein the machine learning model is trained to a conversation domain,
  determine, by the dialogue management module, a dialogue state of the conversation session with the user based on applying the machine learning model to the interpreted voice inputs;
  determine, by an evaluation module based on one or more confidence measures, a capability of an automated dialogue system to continue the conversation session with the user; and
  in response to determining, based on an indication from the evaluation module, that the automated dialogue system does not have the capability to continue the conversation session with the user, provide a seamless transition to a human agent, wherein the seamless transition to the human agent comprises automatically modifying the conversation session to include an agent device of the human agent.

20. A method of automatically integrating a human agent and an automated dialogue system to respond to voice inputs from a user, the method comprising:
  receiving and interpreting, by an automatic speech recognition (ASR) module of a computing system, voice inputs from a user during a conversation session with the user;
  generating a speech output, by a text-to-speech (TTS) module of a computing system, for the conversation session with the user, wherein the speech output is configured for output at an audio device;
  applying, by a dialogue management module of a computing system, a machine learning model to the interpreted voice inputs, wherein the machine learning model is trained to a conversation domain,
  determining, by the dialogue management module, a dialogue state of the conversation session with the user based on applying the machine learning model to the interpreted voice inputs;
  determining, by an evaluation module of a computing system and based on one or more confidence measures, a capability of the automated dialogue system to continue the conversation session with the user; and
  in response to determining, based on an indication from the evaluation module, that the automated dialogue system does not have the capability to continue the conversation session with the user, providing a seamless transition to the human agent, wherein the seamless transition to the human agent comprises automatically modifying the conversation session to include an agent device of the human agent.

* * * * *